United States Patent

Brooks

[15] 3,684,756
[45] Aug. 15, 1972

[54] MOLD RELEASE COMPOSITIONS FROM MIXTURES OF SILICONE RESINS AND SILOXANE FLUIDS

[72] Inventor: Howard Larry Brooks, Sylvania, Ohio

[73] Assignee: Stauffer-Wacker Silicone Corporation, Adrian, Mich.

[22] Filed: July 7, 1970

[21] Appl. No.: 52,988

Related U.S. Application Data

[63] Continuation-in-part of Ser. No. 606,564, Jan. 3, 1967, abandoned.

[52] U.S. Cl......260/29.1 SI, 106/38.22, 260/33.6 SI, 260/33.8 SI, 260/825
[51] Int. Cl.....C08g 47/10, C08g 51/28, C08g 51/30
[58] Field of Search.......260/825, 29.1 SI; 106/38.22

[56] References Cited

UNITED STATES PATENTS

| | | | |
|---|---|---|---|
| 2,833,735 | 5/1958 | Nitzsche | 260/29.1 |
| 3,202,542 | 8/1965 | Poje | 260/29.1 X |
| 3,231,532 | 1/1966 | Modic | 260/29.1 |
| 3,306,542 | 1/1967 | Hadlock | 260/825 |

*Primary Examiner*—Morris Liebman
*Assistant Examiner*—Richard Zaitlen
*Attorney*—Marion D. Ford

[57] ABSTRACT

A mold release composition at least 70 percent of an alkyl terminated organopolysiloxane fluid and at least 2 percent of a partially alkoxylated silicone resin having a hydrolysis level of from 40 to 70 percent and at least 4 percent based on the weight of the resin of a curing agent.

8 Claims, No Drawings

MOLD RELEASE COMPOSITIONS FROM MIXTURES OF SILICONE RESINS AND SILOXANE FLUIDS

This is a continuation-in-part application of the applicant's copending application, Ser. No. 606,564 filed Jan. 3, 1967 now abandoned.

This invention relates to release agents and more particularly to release agents for coating molds.

Heretofore, organopolysiloxanes have been used as release agents for various kinds of materials, such as plastics, metals, ceramics, and the like. However, the heretofore known organopolysiloxane release agents have the disadvantage that they are easily removed from the surface of the mold when subjected to abrasion. Although this phenonmenon is not a problem in some applications, in others where abrasion is substantial, it poses a very serious problem. The abrasion may be attributed in part to the relatively low cohesive strength of the release coating and in part to the fact that there is less adhesion to the base member than is often desired. This combination of factors often causes excessive abrasion of the film during use, which results in bare spots on the base member with attendant sticking.

In addition, many of the organopolysiloxane mold release compositions are unstable, particularly at elevated temperatures. Although this problem has been considerably reduced, it still presents significant difficulty in connection with using these compositions as mold release agents. Consequently, there is a great need for a stable, readily dispersable material which may be used as mold releasing agents.

Therefore, it is an object of this invention to provide novel compositions which serve as release agents.

Another object of this invention is to provide release agents which adhere to the mold surfaces.

Still another object of this invention is to provide a mold release composition which is resistant to abrasion.

A further object of this invention is to provide stable release agents which may readily applied to the mold surfaces.

A still further object of this invention is to provide a process for preparing stable mold release compositions.

These and other objects are achieved in accordance with the present invention, generally speaking, by providing a composition comprising at least 70 percent by weight of an alkyl-terminated organopolysiloxane, at least about 2 percent of a partially alkoxylated silicone resin containing at least about 4 percent based on the weight of the silicone resin of a metal organic compound.

In other words, the mold release composition of this invention contains from about 2 to 10 percent by weight of a partially alkoxylated silicone resin having from about 4 to 20 percent by weight of a metal organic compound based on the weight of the silicone resin and from about 70 to 98 percent by weight of an organopolysiloxane based on the combined weight of the silicone resin and the organopolysiloxane and if desired, an organic solvent or dispersing agent.

In the formation of the silicone resins of this invention, the silane derivatives should contain from about 1 to 3 organic groups and the remaining valences of the silicone atom may be satisfied by any of the well-known readily hydrolyzable radicals or elements such as alkoxy, aryloxy, amino radicals and halogens. Such silane derivatives may be obtained by any appropriate process, such as by simultaneously coupling alkyl or alkyl and aryl Grignard reagents with silicone compounds in the form of tetra-chlorosilane or ethylorthosilicate and refining the crude reaction mixture to obtain the desired derivatives in commercially pure form.

The silicone resins may be prepared by any appropriate method, preferably from a mixture of organohalosilanes of the formula

$$R_mSiX_n$$

wherein R represents an organic group having from one to 18 carbon atoms, X is a halogen group and $m$ is an integer of from 1 to 3 and $n$ is an integer of from 1 to 3 and the sum of $m$ and $n$ is equal to the valence of the silicone atom.

Suitable examples of the organohalosilanes are methyltrichlorosilane, ethyltrichlorosilane, propyltrichlorosilane, dimethylisopropylchlorosilane, butyltrichlorosilane, amyltrichlorosilane, hexyltrichlorosilane, octyltrichlorosilane, dimethyldichlorosilane, dibutyldichlorosilane, dihexyldichlorosilane, dioctyldichlorosilane, trimethylchlorosilane, tripropylchlorosilane, trihexylchlorosilane, trioctylchlorosilane, octylmethyldichlorosilane, stearyltrichlorosilane, trifluorotolylmethyldichlorosilane, and mixtures thereof.

The hydrolysis step may be readily effected by reacting the silanes with water and alcohol in the presence of an organic solvent, preferably benzene, xylene, toluene or naphtha type solvents, such as, mineral spirits. During hydrolysis, particularly in the presence of methyl alcohol, the hydrolyzate generally polymerizes to a substantial extent with the formation of an organopolysiloxane containing alkoxy groups.

In the hydrolysis of chlorine-containing silane derivatives, hydrogen chloride is formed, which may be either totally or partially retained in solution in the aqueous phase, depending upon the temperature, pressure, and amount of water present. Following hydrolysis, the temperature may be increased sufficiently to remove the excess water, hydrogen chloride, and any alcohol present. The resin, preferably in solution, may be washed or otherwise treated to reduce its acidity.

When the silane derivatives contain alkoxy groups, alcohol is a product of the hydrolysis which may be retained in the aqueous phase. In some cases, it is often desirable to add an alcohol to the hydrolysis medium to act as a solvent. In addition, it is preferred that a catalyst such as an acid or basic material, for example, hydrochloric or oxalic acid, be added to the aqueous phase. The hydrolyzate may then be resinified in the presence of the aqueous acid with mild heating. The resinified material may be separated from the water, acid, and alcohol by any appropriate procedure.

The silicone resins of this invention are prepared by hydrolyzing and polymerizing a mixture of mono and di-substituted alkylhalosilanes, such as for example, methyltrichlorosilane, dimethyldichlorosilane and a halosilane having from three to 18 carbon atoms, such as, propyltrichlorosilane in the presence of water and methyl alcohol at a temperature of from about 24° to 80° C. in the presence of an inert hydrocarbon solvent.

The reaction mixture is cooled, neutralized with a basic material, such as sodium methylate or sodium bicarbonate, filtered and then heated to reflux temperature at a reflux ratio of about 1:1 to remove the volatile materials. The final product is a partially hydrolyzed methyltrimethoxysilane, propyltrimethoxysilane and dimethyldimethoxysilane compound in xylene.

The amount of water added to hydrolyze the mixed silanes should be sufficient to theoretically hydrolyze from 40 to 70 percent of the Si—Cl bonds. However, where sufficient water is added to theoretically convert about 50 percent of the Si—Cl bonds in the mixture of silanes, the actual level of hydrolysis will be increased to about 75 to 80 percent due to water formed by condensation, coupled with vent loss of silicon. It is preferred, that only enough water be present during hydrolysis to hydrolyze from 40 to 70 percent and more preferably from about 50 to 60 percent of the Si—Cl bonds. Where the hydrolysis level exceeds about 70 percent, the silicone resin has a tendency to gel.

Also, it has been found that the residue obtained from the hydrolysis of propyltrichlorosilane, which boils above about 143° C., may be substituted for the propyltrichlorosilane in the above described formulation. The residue may be obtained from the hydrolysis of propyltrichlorosilane in a mixture of methanol and water and a suitable solvent such as hexane. Generally, the hydrolysis takes place in a two stage reactor where the propyltrichlorosilane and methanol, in a mol ratio of about 1:2, are reacted in the presence of a solvent and less than the theoretical amount of water necessary to hydrolyze the chlorine in the chlorosilane at a temperature of from about 0° to 100° C., preferably from about 0° to about 50° C. The reaction mixture is then transferred to a second stage where an additional mol of methanol is added as the reaction mixture is then heated to from 50° to about 175° C., preferably from 100° to 175° C.

The reaction mixture is then cooled and neutralized with a basic substance such as sodium bicarbonate or the like, filtered and distilled. The volatile materials along with the propyltrimethoxysilane are distilled off up to a temperature of about 140° to 145° C., preferably between about 141° and 143° C. The residue boiling above about 143° C. is recovered and may be used as a substitute for the propyltrichlorosilane in the formation of the silicone resin.

A curing agent is added to the silicone resin thus formed, such as, for example, metal organic compounds. Examples of suitable curing agents are tetraalkyl titanates such as, tetraisopropyltitanates, tetrabutyltitanate, tetramethyltitanate, tetraethyltitanate, tetra-2-ethylhexyltitanate; tetraalkyl zirconates such as tetraisopropylzirconate, tetrabutylzirconate, tetraoctylzirconate and metal salts of carboxylic acids such as, lead octoate, lead naphthenate, tin octoate, dibutyltin diacetate, dibutyltin dilaurate, ferric naphthenate, ferric octoate, cobalt octoate, zinc naphthenate, zinc-2-ethylhexoate. It is preferred that the curing agent be present in the silicone resin in an amount from about 4 to 20 percent and more preferably from about 5 to 15 percent based on the weight of the silicone resin. In addition, the curing agent may be added to the organopolysiloxane and then combined with the silicone resin.

The organopolysiloxane fluids suitable for use in this invention are generally alkyl-terminated polysiloxane fluids having from one to 18 carbon atoms bonded to the silicon atom. Examples of suitable organopolysiloxane fluids are those having alkyl radicals such as methyl, ethyl, propyl, butyl, hexyl, octyl, decyl, dodecyl, tetradecyl, hexadecyl, octadecyl and the like; aryl radicals such as phenyl and naphthyl and mixtures thereof. Generally, it is preferred that the organopolysiloxane be free of terminal-hydroxyl groups; however, a small number of terminal-hydroxyl groups will not materially affect the mold release composition. The organopolysiloxane may have a minor proportion of molecules with only one hydroxyl group or there may be a small number of molecules present carrying in excess of two hydroxyl groups. However, as mentioned previously, it is preferred that the organopolysiloxane be substantially free of hydroxyl groups. In general, the polysiloxane fluids should have a molecular weight of between about 3,000 and 90,000 which is equivalent to a viscosity of between about 50 and 100,000 centipoises, preferably from about 100 to 5,000 centipoises. Optimum results have been obtained in the lower portion of these ranges such as from about 200 to 500 centipoises. In addition, it is possible to combine high and low viscosity fluids to form a fluid having the desired viscosity range.

The organopolysiloxane fluids used in accordance with this invention may be represented by the formula

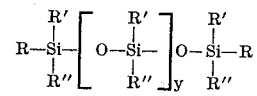

wherein R, R' and R'' which may be the same or different represent organic groups having from one to 18 carbon atoms, preferably alkyl groups having from one to four carbon atoms, and y has a value of from 80 to about 150,000.

These new mold release compositions are composed of a major proportion of organopolysiloxane fluids, preferably a methyl-terminated organopolysiloxane fluid and a minor proportion of a silicone resin containing a metal organic compound. It is preferred, that the composition contain from about 80 to 98 percent by weight of organopolysiloxane fluid and from about 2 to 8 percent by weight of the silicone resin. The composition thus used generally contains from about 5 to 7 percent of silicone resin, although the proportion of silicone resin may be increased up to about 10 percent. It is preferred, that the amount of silicone resin not exceed about 10 percent in as much as the use of a greater proportion of resin does not appear to provide any substantial improvement in the mold release properties.

Quite surprising, it was discovered that the incorporation of but a minor proportion of the silicone resin containing a metal organic compound greatly improved the mold release characteristics, while providing an excellent coating composition which withstood repeated uses of the coated mold under high temperature conditions. It was further found, that the new composition was markedly superior to the prior silicone and polysiloxane resins heretofore used in a number of applications.

The new coating compositions comprising an organopolysiloxane fluid or a mixture of polysiloxane fluids and a silicone resin containing a metal organic compound are dissolved in a liquid organic solvent. It is preferred that the solvents be sufficiently volatile to vaporize during the application process. Preferred solvents include toluene, xylene, benzene, naphtha type solvents and hydrocarbon solvents, especially chlorinated aliphatic hydrocarbons.

The coating composition may be compounded in any conventional manner. Preferably, the organopolysiloxane fluid is added to the silicone resin solution with agitation, however, the metal organic compound may be added to the organopolysiloxane fluid and then blended with the silicone resin solution.

The composition may be applied to the mold surfaces as a concentrated or dilute solution or as a dispersion. It is preferred that the composition be dissolved in a volatile organic solvent and then sprayed or brushed on the mold surfaces in the form of a thin film. This is best obtained by rubbing the mold surfaces with a swab saturated with a solution of the material. Such rubbing tends to work the release agent into the pores of the mold surfaces to give superior release properties. However, when practical, the mold surfaces may be sprayed with the composition to form a thin film thereon.

Once the release composition has been applied to the mold surfaces, it may be used immediately. Where an organic solvent has been used, it is preferred that the coating be dried for a sufficient time either at room temperature or in the presence of heated air to remove the solvent and form a thin silicone film on the mold surfaces.

The method of this invention is applicable to any type of molded surface such as metal, wood, plastic, or ceramic. As mentioned previously, the method of this invention is particularly useful in providing mold release surfaces for molding articles from plastics, such as urethane elastomers, epoxies, and the like. It is also particularly useful in obtaining the release of organic plastic materials which are molded in wood or plastic molds. In this respect, the method of this invention represents a substantial contribution to the molding art since most of the present day commercial pressure molding of organic plastics is carried out in plastic or wood molds. The use of the composition of this invention has produced satisfactory release of plastic and wood molds where heretofore no known compositions have been entirely satisfactory. Release and/or corrosion protection may be derived for various manufacturing equipment, such as conveyors, presses, pipes, conduits, and the like.

The following examples are illustrative of the invention and are not to be construed as limiting the scope of the invention. All parts are by weight unless otherwise specified.

EXAMPLE 1

Preparation of Silicone Resin

The silicone resin is a partially condensed, partially methoxylated, methyl and propyl polysiloxane prepared by controlled hydrolysis and condensation of organohalosilanes. The silane starting materials are as follows:

|  | Parts |
|---|---|
| Methyltrichlorosilane | 359 |
| Dimethyldichlorosilane | 103 |
| Propyltrichlorosilane | 142 |

A mixture containing the above parts of chlorosilanes are added to a three-necked flask containing about 700 parts of xylene. About 358 parts of anhydrous methanol are added to the mixture with agitation and the reaction mixture heated to about 78° C. for a period of about 4 hours. The reaction mixture is then cooled to about 50° C. and about 100 parts by volume of a 25 percent solution of sodium methylate in methanol are added dropwise over a period of about 15 minutes. Additional sodium methylate solution is added in small increments until the pH is between 3.0 and 3.5. The reaction mixture is filtered to produce a clear colorless product which is then heated at a temperature of about 136.5° C. Approximately 183.4 parts of material is recovered which is mixed with about 16.6 parts of xylene to provide a 34 percent solids concentration. Analysis of the product gave the following results:

| Specific gravity (77° F.) | 0.928 |
|---|---|
| Methoxy content | 9.4 percent |
| Viscosity (77° C.) | 1.04 centistokes |
| pH | 4.2 |
| Ratio $OCH_3:CH_3$ | 1:11 |
| Hydroxyl content | 1 percent |

EXAMPLE 2

Preparation of Mold Release Composition

To about 10 parts of the silicone resin solution prepared in accordance with the procedure described in Example 1 are added about 1.60 parts of tetraoctyltitanate and about 90 parts of methyl-terminated dimethylpolysiloxane having a viscosity of about 500 cps. with agitation. The solution is then sprayed on the surface of the metal mold and the xylene solvent removed by evaporation in an oven at 150° C. for about 30 minutes. The mold exhibits excellent release properties when plastic articles are molded therein.

EXAMPLE 3

Preparation of Silicone Resin

To a reactor containing about 1,400 parts of xylene are added a solution consisting of about 100 parts of water and about 809 parts of methanol. A mixture of silanes consisting of about 718 parts of methyltrichlorosilane, 285 parts of propyltrichlorosilane and about 206 parts of dimethyldichlorosilane are added as a separate stream simultaneously with the methanol-water solution to the reactor at such a rate that the last of the chlorosilanes are added at the same time as the last of the methanol-water solution is added. The reaction temperature is increased to about 40° to 45° C. during the addition of the reactants and thereafter increased gradually to a temperature of about 70° C. The reaction mixture is maintained at reflux temperature for a period of about 4 hours while hydrogen chloride is evolved from the system. The reaction mass is cooled to about 50°C., followed by the addition of sodium bicarbonate in 40 part portions until a total of about 360 parts are added. The reaction mass is heated to distill off the methanol at a reflux ratio of 1:1 until all the methanol is removed. The resin-sodium bicarbonate mixture is cooled to room temperature and filtered. The following is an analysis of the product thus formed:

| | |
|---|---|
| SiO₂ content | 28 percent |
| Color | water white |
| Concentration (solids) | 35 percent |

EXAMPLE 4

Preparation of Mold Release Composition

About 7.35 parts of silicone resin prepared in accordance with the procedure described in Example 3 and containing about 1.2 parts of tetra-octyltitanate is dissolved in 2.5 parts of xylene and added with agitation to a mixture of methyl-terminated polysiloxane fluids containing 20.5 parts of dimethylpolysiloxane fluid having a viscosity of about 10,000 cps. and 69.6 parts of a dimethylpolysiloxane fluid having a viscosity of about 50 cps. The composition is sprayed on the surface of a mold and dried at room temperature for about 15 minutes. The mold exhibits excellent release properties even after several molding cycles.

EXAMPLE 5

Preparation of Silicone Resin

To a reactor is added with agitation about 87 parts of methanol, about 17.8 parts of water, about 123 parts of naphtha and a mixture of chlorosilanes consisting of about 128 parts of methyltrichlorosilane, about 37 parts of dimethyldichlorosilane and about 51 parts of propyltrichlorosilane at a temperature of from about 15° to 25° C. The reaction mass is heated to a temperature between about 118° to about 150° C. and maintained at this temperature for about 4 hours. The reaction mass is cooled and sufficient sodium bicarbonate is added in several increments to raise the pH to between 3.0 and 3.5. The reaction mass is heated to a temperature of about 120° C. to distill off the volatile products thereafter filtered. A clear colorless product is recovered which is diluted with naphtha to provide a 30 percent solids concentration.

EXAMPLE 6

Preparation of Silicone Resin

To a reactor is added with agitation about 84 parts of methanol, about 12.2 parts of water, about 112 parts of xylene and a mixture of chlorosilanes consisting of about 125 parts of methyltrichlorosilane, 36 parts of dimethyldichlorosilane and about 37 parts of a partially condensed propyltrimethyoxysilane having a boiling range above 143° C. at a temperature of from about 15° to 25° C. The reaction mass is heated to a temperature between about 120° to 130° C. and maintained at this temperature for about 4 hours. The reaction mass is cooled and sufficient bicarbonate is added in several increments to raise the pH to between 3.0 and 6.5. The reaction mass is heated to about 100° C. to distill off the volatile products and thereafter filtered. A clear colorless product is recovered which is diluted with xylene to provide a 30 percent solids concentration.

EXAMPLE 7

Preparation of Silicone Resin

To a reactor is added with agitation about 84 parts of methanol, about 15.6 parts of water, about 112 parts of xylene and a mixture of chlorosilanes consisting of about 119 parts of methyltrichlorosilane, about 34 parts of dimethyldichlorosilane, and about 35 parts of partially condensed propyltrimethoxysilane having a boiling range above 143° C. at a temperature of from about 15° to 25° C. The reaction mass is heated to a temperature between about 120° and 130° C. and maintained at this temperature for about 4 hours. The reaction mass is cooled and sufficient sodium bicarbonate is added in several increments to raise the pH to between 3.0 and 6.5. The reaction mass is heated to between about 117° and 130° C. to distill off the volatile products and thereafter filtered. A clear colorless product is recovered which is dilute with xylene to provide a 40 percent solids concentration.

EXAMPLE 8

Preparation of Silicone Resin

To a reactor containing about 700 parts of xylene are added about 358 parts of methanol, about 86.4 parts of water and a mixture of chlorosilanes containing about 359 parts of methyltrichlorosilane, about 103 parts of dimethyldichlorosilane and about 142 parts of propyltrichlorosilane at a temperature of about 15° to 25° C. The reaction mass is heated to a temperature of about 100° C. for a period of about 4 hours. The reaction mixture is cooled to about 50° C. and about 100 parts by volume of a 25 percent solution of sodium methylate in methanol are added dropwise over a period of about 15 minutes. Additional sodium methylate solution is added in small increments until the pH is between 3.5 and 5.0. The reaction mass is filtered and then heated to a temperature of about 136.5° C. to remove the volatile products. A clear colorless product is recovered which is diluted with xylene to provide a 34 percent solids concentration. The hydrolysis level of the silicone resin is calculated to be about 86 percent. Addition of about 16.5 parts of tetra-octyltitanate to about 300 parts of a 34 percent solution resulted in substantial gelling of the composition.

EXAMPLE 9

Preparation of Silicone Resin

The procedure described in Example 8 is repeated except that 32.4 parts of water are used. About 16.5 parts of tetraoctyltitanate is added to about 300 parts of a 34 percent solution to form a composition which is substantially free of gel formation. The hydrolysis level for the silicone resin is calculated to be about 33 percent.

A mold release composition prepared in accordance with the procedure of Example 4 exhibits poor release characteristics.

EXAMPLE 10

Preparation of Mold Release Composition

Approximately 9 parts of silicon resin prepared in accordance with the procedure described in Example 5 and containing about 1.8 parts of tetra-octyltitanate and about 30 parts of methylene chloride are added with agitation to a mixture of methyl-terminated polysiloxane fluids containing about 12.5 parts of a dimethylpolysiloxane fluid having a viscosity of about 60,000 cps. and about 76.5 parts of a dimethylpolysiloxane fluid having a viscosity of about 50 cps.

The resulting composition is applied to the surface of a mold by a swab technique and dried in an oven at a temperature of about 150° C. for about 3 hours. The mold exhibits excellent release characteristics even after several molding cycles.

EXAMPLE 11

Preparation of Mold Release Composition

The procedure described in Example 10 is repeated except that 7.35 parts of silicone resin containing 1.2 parts of tetra-octyltitanate prepared in accordance with Example 6 are added to the mixture of methyl-terminated dimethyl polysiloxane fluids. A plastic mold dipped in the above composition and dried exhibits excellent release properties even after several molding cycles.

EXAMPLE 12

Preparation of Mold Release Composition

The procedure described in Example 10 is repeated except that 7.35 parts of silicone resin containing 1.2 parts of tetra-octyltitanate prepared in accordance with Example 7 and 10 parts of xylene are added to about 80 parts of methyl-terminated methylphenylpolysiloxane fluid having a viscosity of 40,000 cps. with agitation. The solution is then applied to a mold, dried in an oven at 150° C. and then used in the molding of metallic articles. The mold exhibits excellent release properties even after several molding cycles.

EXAMPLE 13

Preparation of Mold Release Composition

The procedure described in Example 10 is repeated except that 9 parts of the silicone resin composition containing 1.5 parts of tetra-octyltitanate prepared in accordance with Example 8 and containing 10 parts of xylene are added to about 80 parts of methyl-terminated dimethylpolysiloxane fluid having a viscosity of 40,000 cps. with agitation. The solution is applied to a mold surface by spraying and heated to a temperature of about 150° C. in an oven for about 6 hours. The surface coating thus produced exhibits poor adhesion and poor resistance to abrasion.

EXAMPLE 14

Preparation of Silicone Resin

The procedure described in Example 5 is repeated except that about 71 parts of octyltrichlorosilane is substituted for the propyltrichlorosilane. A liquid product is recovered which is diluted with naphtha to provide a 40 percent solids concentration.

When the resin is combined with tetra-octyltitanate in accordance with the procedure of Example 11, a composition is obtained which exhibits excellent release characteristics.

EXAMPLE 15

Preparation of Mold Release Composition

The procedure described in Example 9 is repeated except that 1.5 parts of tetra-octylzirconate is substituted for the tetra-octyltitanate. A mold surface coated with this composition exhibits excellent release properties.

Although the present invention has been defined specifically with reference to the above noted examples, it should be understood that these examples were given for illustration purposes only. Other variations will become apparent to those skilled in the art upon reading this disclosure. These variations are intended to be included within the scope of this invention.

The invention claimed is:

1. A mold release composition comprising a silicone resin having a hydrolysis level of from 40 to 70 percent, said silicone resin being obtained from the hydrolysis and condensation of a mixture of halosilanes containing mono- and dialkyl substituted halosilanes and mono-alkyl substituted halosilanes having from three to 18 carbon atoms with an alcohol-water solution at an elevated temperature, a curing agent in an amount of from 4 to 20 weight percent based on the weight of the silicone resin, said curing agent being selected from the group consisting of a metal salt of a carboxylic acid, tetra-alkyltitanates and zirconates, an organopolysiloxane fluid in an amount of from 70 to 98 percent by weight and having a viscosity of from 50 to 100,000 cps., and the balance of the composition being an organic solvent selected from the class consisting of a hydrocarbon and a chlorinated hydrocarbon solvent, said silicone resin being present in the composition in an amount of from 2 to 10 weight percent based on the combined weight of the organopolysiloxane fluid and the silicone resin.

2. The composition of claim 1 wherein the organopolysiloxane has a carbon to silicon ratio of at least 2.

3. The composition of claim 1 wherein the organopolysiloxane has the formula:

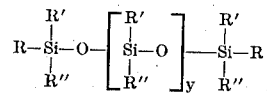

wherein R, R' and R" represent organic groups and y is a value of from 80 to about 150,000.

4. The composition of claim 3 wherein R, R' and R" represent lower alkyl groups.

5. The composition of claim 3 wherein R is a methyl radical.

6. The composition of claim 1 wherein the curing agent is tetraoctyltitanate.

7. The composition of claim 1 wherein the silicone resin is obtained from a mixture containing methyltrichlorosilane, dimethyldichlorosilane and propyltrichlorosilane.

8. The composition of claim 7 wherein the residue obtained from the hydrolysis of propyltrichlorosilane with methanol and water and boiling above 143° C. is substituted for the propyltrichlorosilane.

* * * * *